United States Patent
Akbar Attar et al.

(10) Patent No.: US 8,660,095 B2
(45) Date of Patent: Feb. 25, 2014

(54) REVERSE LINK TRANSMIT POWER CONTROL IN A WIRELESS COMMUNICATION SYSTEM

(75) Inventors: Rashid Ahmed Akbar Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1085 days.

(21) Appl. No.: 11/486,750

(22) Filed: Jul. 14, 2006

(65) Prior Publication Data

US 2007/0019589 A1    Jan. 25, 2007

Related U.S. Application Data

(60) Provisional application No. 60/701,886, filed on Jul. 21, 2005.

(51) Int. Cl.
*H04B 7/216* (2006.01)

(52) U.S. Cl.
USPC ........ 370/335; 455/450; 455/451; 455/452.1; 370/318

(58) Field of Classification Search
USPC ............... 370/335, 318; 455/450, 451, 452.1, 455/464, 13.4, 522, 136, 127.2, 177.1, 455/200.1, 232.1
See application file for complete search history.

(56) References Cited

U.S. PATENT DOCUMENTS

| | | | |
|---|---|---|---|
| 6,173,162 B1 * | 1/2001 | Dahlman et al. | 455/69 |
| 6,618,598 B1 * | 9/2003 | Gandhi et al. | 455/522 |
| 7,620,096 B2 * | 11/2009 | Bar-Ness et al. | 375/144 |
| 2001/0012785 A1 | 8/2001 | Esteves et al. | |
| 2002/0142791 A1 * | 10/2002 | Chen et al. | 455/522 |
| 2003/0050084 A1 * | 3/2003 | Damnjanovic et al. | 455/522 |
| 2004/0009783 A1 * | 1/2004 | Miyoshi | 455/522 |
| 2005/0025077 A1 * | 2/2005 | Balasubramanian et al. | 370/310 |

(Continued)

FOREIGN PATENT DOCUMENTS

| | | |
|---|---|---|
| CN | 1343398 A | 10/2004 |
| CN | 1801663 A | 7/2006 |

(Continued)

OTHER PUBLICATIONS

International Search Report and Written Opinion—PCT/US2006/028371, International Search Authority—European Patent Office—Jan. 15, 2007.

(Continued)

*Primary Examiner* — Wayne Cai
(74) *Attorney, Agent, or Firm* — Kevin T. Cheatham

(57) ABSTRACT

In one embodiment, the patent application comprises an apparatus, method and means for controlling power of an access terminal by adjusting a power of at least one secondary reverse link carrier by computing a forward link power differential, computing a reverse link power differential, and adding a power level of a primary reverse link carrier pilot with the forward link power differential and the reverse link power differential. In another embodiment, the patent application comprises an apparatus, method and means for controlling power of an access terminal by adjusting a power of at least one secondary reverse link carrier by computing a forward link power differential, computing a reverse link load differential, and adding a power level of a primary reverse link carrier pilot with the forward link power differential and the reverse link load differential.

41 Claims, 16 Drawing Sheets

(56) References Cited

U.S. PATENT DOCUMENTS

2005/0030953 A1* 2/2005 Vasudevan et al. ........ 370/395.4
2005/0215289 A1* 9/2005 Rensburg et al. .......... 455/562.1
2005/0239460 A1* 10/2005 Kroth et al. ................... 455/434

FOREIGN PATENT DOCUMENTS

| EP | 1195920 A1 | 1/2007 |
|---|---|---|
| JP | 2002503427 A | 1/2002 |
| JP | 2002152130 A | 5/2002 |
| JP | 2003032218 | 1/2003 |
| JP | 2004019649 A | 1/2004 |
| JP | 2004350329 A | 12/2004 |
| JP | 2005505967 A | 2/2005 |
| JP | 2005513972 A | 5/2005 |
| JP | 2009505533 | 2/2009 |
| TW | 584994 | 4/2004 |
| WO | WO9858461 | 12/1998 |
| WO | WO03030401 A1 | 4/2003 |
| WO | WO03056860 A1 | 7/2003 |

OTHER PUBLICATIONS

Taiwanese Search report—095126621—TIPO—May 26, 2010.

* cited by examiner

REVERSE LINK TRANSMIT POWER CONTROL IN A WIRELESS COMMUNICATION SYSTEM

This application claims benefit of U.S. Provisional Application titled "Reverse Link Transmit Power Control in a Wireless Communication System," filed Jul. 21, 2005 and assigned patent application No. 60/701,886, the entire disclosure of this application being considered part of the disclosure of this application.

BACKGROUND

1. Field

The present application for patent relates generally to multi-carrier wireless communication systems, and more specifically to reverse link open loop power control.

2. Background

Communication systems may use a single carrier frequency or multiple carrier frequencies. In wireless communication systems, a channel consists of a forward link (FL) for transmissions from the access network (AN) 120 to the access terminal (AT) 106 and a reverse link (RL) for transmissions from the AT 106 to the AN 120. (The AT 106 is also known as a remote station, a mobile station or a subscriber station. Also, the access terminal (AT) 106, may be mobile or stationary. Each link may incorporate a different number of carrier frequencies. Furthermore, an access terminal 106 may be any data device that communicates through a wireless channel or through a wired channel, for example using fiber optic or coaxial cables. An access terminal 106 may further be any of a number of types of devices including but not limited to PC card, compact flash, external or internal modem, or wireless or wireline phone). An example of a cellular communication system 100 is shown in FIG. 1A where reference numerals 102A to 102G refer to cells, reference numerals 160A to 160G refer to base stations and reference numerals 106A to 106G refer to access terminals.

It is noted that the data rate control (DRC), data source control (DSC), acknowledge (ACK), reverse rate indicator (RRI), Pilot and Data (or Traffic) channels are channels transmitted on the reverse link. The DRC, DSC, ACK, RRI and Pilot are overhead channels. When there is only one DSC on the reverse link carrier, information is provided to a base station 160 for one forward link carrier, the primary forward link (FL) carrier. On the other hand, there may be a plurality of DRC and ACK channels which provide information to a base station 160 for a primary and secondary FL carriers. Also, there will be one RRI and one Pilot channel on each reverse link carrier which provide information on the AT. It is also noted that the FL carriers carry Traffic (or Data) channels and overhead channels such as the ACK channel, the reverse power channel (RPC) and the reverse activity bit (RAB) channel. These overhead channels provide information to the AT.

The system 100 may be a code division multiple access (CDMA) system having a High Data Rate, HDR, overlay system, such as specified in the HDR standard. In HDR Systems, the HDR base stations 160 may also be described as access points (AP) or modem pool transceivers (MPTs). An HDR subscriber station 106, referred to herein as an Access Terminal (AT) 106 and may communicate with one or more HDR base stations 160, referred to herein as modem pool transceivers (MPTs) 160.

An architecture reference model for a communication system may include an access network (AN) 120 in communication with an AT 106 via an air interface. An access terminal 106 transmits and receives data packets through one or more modem pool transceivers 160 to a HDR base station controller 130, referred to herein as a modem pool controller 130 (MPC) by way of the air interface. The AN 120 communicates with an AT 106, as well as any other ATs 106 within system, by way of the air interface. The communication link through which the access terminal 106 sends signals to the modem pool transceiver 160 is called the reverse link. The communication link through which a modem pool transceiver 160 sends signals to an access terminal 106 is called a forward link. Modem pool transceivers 160 and modem pool controllers 130 are parts of an access network (AN) 120. The AN 120 includes multiple sectors, wherein each sector provides at least one channel. A channel is defined as the set of communication links for transmissions between the AN 120 and the AT's 106 within a given frequency assignment. A channel consists of a forward link for transmissions from the An 120 to the AT 106 and a reverse link for transmissions from the AT 106 to the AN 120. The access network 120 may be further connected to additional networks 104 outside the access network 120, such as a corporate intranet or the Internet, and may transport data packets between each access terminal 106 and such outside networks 104. An access terminal 106 that has established an active traffic channel connection with one or more modem pool transceivers 160 is called an active access terminal 106, and is said to be in a traffic state. An access terminal 106 that is in the process of establishing an active traffic channel connection with one or more modem pool transceivers 130 is said to be in a connection setup state.

FIG. 1B is a simplified functional block diagram of an exemplary CDMA communications system. As stated above, a base station controller 130 can be used to provide an interface between a network 104 and all base stations 160 dispersed throughout a geographic region. For ease of explanation, only one base station 160 is shown. The geographic region is generally subdivided into smaller regions known as cells 102. Each base station 160 is configured to serve all subscriber stations 106 in its respective cell. In some high traffic applications, the cell 102 may be divided into sectors with a base station 160 serving each sector. In the described exemplary embodiment, three subscriber stations 106A-C are shown in communication with the base station 160. Each subscriber station 106A-C may access the network 104, or communicate with other subscriber stations 106, through one or base stations 160 under control of the base station controller 130.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In multi-access communications systems, techniques to reduce mutual interference between multiple users are often utilized to increase user capacity. By way of example, power control techniques can be employed to limit the transmission power of each user to that necessary to achieve a desired quality of service. This approach ensures that each user transmits only the minimum power necessary, but no higher, thereby making the smallest possible contribution to the total noise seen by other users. These power control methods may become more complex in multi-access communications systems supporting users with multiple channel capability. In addition to limiting the transmission power of the user, the allocated power should be balanced between the multiple channels in a way that optimizes performance.

A power control system may be employed to reduce mutual interference between the multiple subscriber stations 106. The power control system may be used to limit the transmission power over both the forward and reverse links to achieve a desired quality of service. The reverse link transmission power is typically controlled with two power control loops, an open and a closed loop. The first power control loop is an open loop control. The open control loop is designed to control the reverse link transmission power as a function of path loss, the effect of base station 160 loading, and environmentally induced phenomena such as fast fading and shadowing.

The second power control loop is a closed loop control. The closed loop control has the function of correcting the open loop estimate to achieve a desired signal-to-noise ratio (SNR) at the base station 160. This can be achieved by measuring the reverse link transmission power at the base station 160 and providing feedback to the subscriber station 106 to adjust the reverse link transmission power. The feedback signal can be in the form of a reverse power control (RPC) command which is generated by comparing the measured reverse link transmission power at the base station 160 with a power control set point. If the measured reverse link transmission power is below the set point, then an RPC up command is provided to the subscriber station 106 to increase the reverse link transmission power. If the measured reverse link transmission power is above the set point, then an RPC down command is provided to the subscriber station 106 to decrease the reverse link transmission power.

The open and closed loop controls may be used to control the transmission power of various reverse link channel structures. By way of example, in some CDMA communications systems, the reverse link waveform includes a traffic channel to carry voice and data services to the base station 160 and a pilot channel used by the base station 160 for coherent demodulation of the voice and data. In these systems, the open and closed loop controls can be used to control the reverse link power of the pilot channel.

Initial mobile transmit power is a power control problem when a mobile 106 first establishes a connection with an access point 160. The base station 160 may not control the mobile 106 before it establishes contact with the base station 160. Thus, what power level should the mobile 106 use to transmit its request when initially attempting to access the base station 160? Under the open loop control for single carrier, reverse links as specified in the IS-95 standard, the mobile 106 transmits a series of access probes on the single reverse link carrier when the mobile 106 first attempts to access the base station 160. Thus, the "primary carrier power" is estimated by an open loop control loop.

In a single carrier system, the AT 106 sends an access probe to the AN 120 to access the network 120. Access probes are a series of transmissions of progressively higher power. The mobile 106 transmits its first access probe at a relatively low power, then it waits for a response back from the base station 160. If the mobile 106 does not receive an acknowledgement from the base station 160 after a random time interval, then the mobile 106 transmits a second access probe at a slightly higher power. The process repeats until the mobile 106 receives an acknowledgement in the form of an Access Channel Acknowledge (ACAck) back from the base station 160. Thus, in response, the AN 120 sends an access channel acknowledge signal ACAck. The acknowledgement, ACAck, is received on the access channel. Thus, the initial transmit power for a reverse link traffic channel is determined by the access channel acknowledge signal, and the power level of the corresponding access probe. The system parameter PWR_STEP is the step size for a single access probe correction.

SUMMARY OF THE INVENTION

In view of the above, the described features of the present invention generally relate to one or more improved systems, methods and/or apparatuses for communication speech.

In one embodiment, the patent application comprises an apparatus, method and means for controlling power of an access terminal by adjusting a power of at least one secondary reverse link carrier by computing a forward link power differential, computing a reverse link power differential, and adding a power level of a primary reverse link carrier pilot with the forward link power differential and the reverse link power differential.

In another embodiment, the patent application comprises an apparatus, method and means for controlling power of an access terminal by adjusting a power of at least one secondary reverse link carrier by computing a forward link power differential, computing a reverse link load differential, and adding a power level of a primary reverse link carrier pilot with the forward link power differential and the reverse link load differential.

DETAILED DESCRIPTION

Figure 1A:
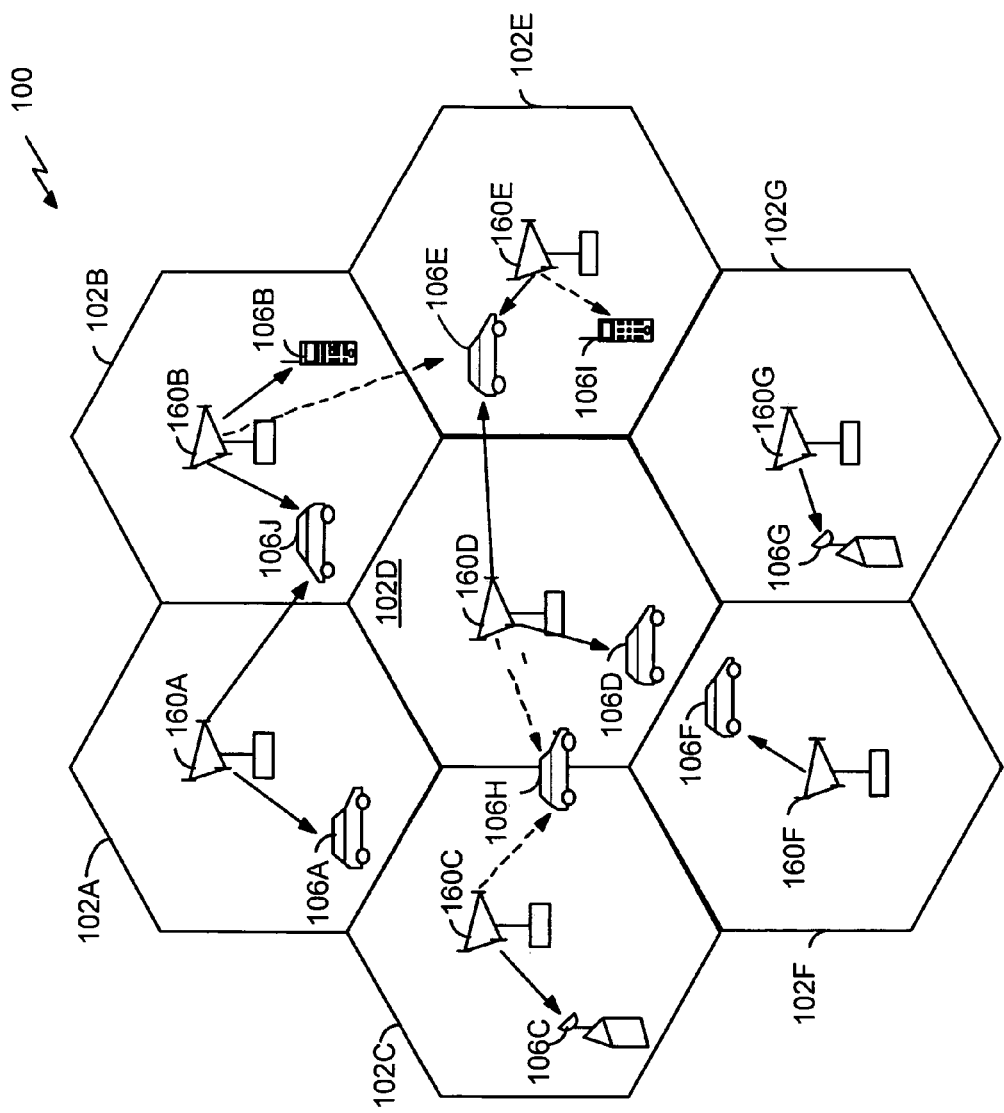
FIG. 1A is a diagram of a cellular communication system.
Figure 1B:
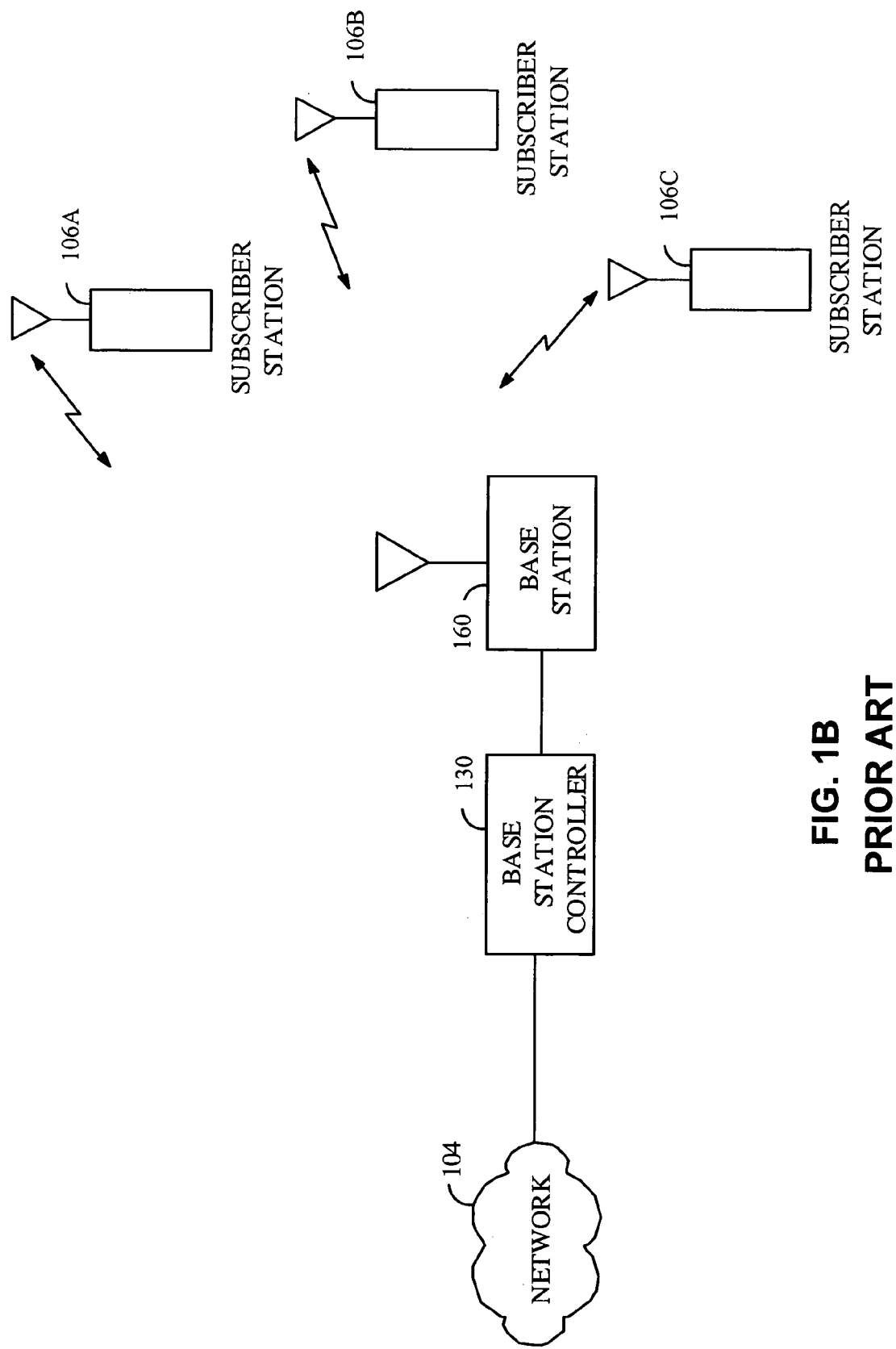
FIG. 1B is a simplified functional block diagram of an exemplary subscriber station adapted for operation in a CDMA communications system.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Various aspects of these power control methods will be described in the context of a CDMA communications system, however, those skilled in the art will appreciate that the methods for open loop power control of multiple reverse channels are likewise suitable for use in various other communications environments. Accordingly, any reference to a CDMA communications system is intended only to illustrate the inventive aspects of the present invention, with the understanding that such inventive aspects have a wide range of applications.

CDMA is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random noise (PN) code that modulates a carrier, and thereby, spreads the spectrum of the signal waveform. The transmitted signals are separated in the receiver by a correlator that uses a corresponding PN code to despread the desired signal's spectrum. The undesired signals, whose PN codes do not match, are not despread in bandwidth and contribute only to noise.

An exemplary CDMA communications system supporting a variable data rate request scheme is a High Data Rate (HDR) communications system. The HDR communications system is typically designed to conform one or more standards such as the "cdma2000 High Rate Packet Data Air Interface Specification," 3GPP2 C.S0024, Version 2, Oct. 27, 2000, promulgated by a consortium called "3.sup.rd Generation Partnership Project".

For data transmissions, the AN 120 receives a data request from the AT 106. The data request specifies the data rate at which the data is to be sent, the length of the data packet transmitted, and the sector from which the data is to be sent. The AT 106 determines the data rate based on the quality of the Channel between the AN 120 and the AT 106. In one embodiment the quality of the Channel is determined by the Carrier-to-Interference ratio, C/I. Alternate embodiments may use other metrics corresponding to the quality of the Channel. The AT 106 provides requests for data transmissions by sending a Data Rate Control, DRC, message via a specific channel referred to as the DRC channel. The DRC message includes a data rate portion and a sector portion. The data rate portion indicates the requested data rate for the AN 122 to send the data, and the sector indicates the sector from which the AN 122 is to send the data. Both data rate and sector information are typically required to process a data transmission. The data rate portion is referred to as a DRC value, and the sector portion is referred to as a DRC cover. The DRC value is a message sent to the AN 120 via the air interface. In one embodiment, each DRC value corresponds to a data rate in Kbits/sec having an associated packet length according to a predetermined DRC value assignment. The assignment includes a DRC value specifying a null data rate. In practice, the null data rate indicates to the AN 120 that the AT 106 is not able to receive data. In one situation, for example, the quality of the Channel is insufficient for the AT 106 to receive data accurately.

In operation, the AT 106 may continuously monitor the quality of the Channel to calculate a data rate at which the AT 106 is able to receive a next data packet transmission. The AT 106 then generates a corresponding DRC value; the DRC value is transmitted to the AN 120 to request a data transmission. Note that typically data transmissions are partitioned into packets. The time required to transmit a packet of data is a function of the data rate applied.

This DRC signal also provides the information, which the channel scheduler uses to determine the instantaneous rate for consuming information (or receiving transmitted data) for each of the remote stations associated with each queue. According to an embodiment, a DRC signal transmitted from any remote station 106 indicates that the remote station 106 is capable of receiving data at any one of multiple effective data rates.

Figure 2A:
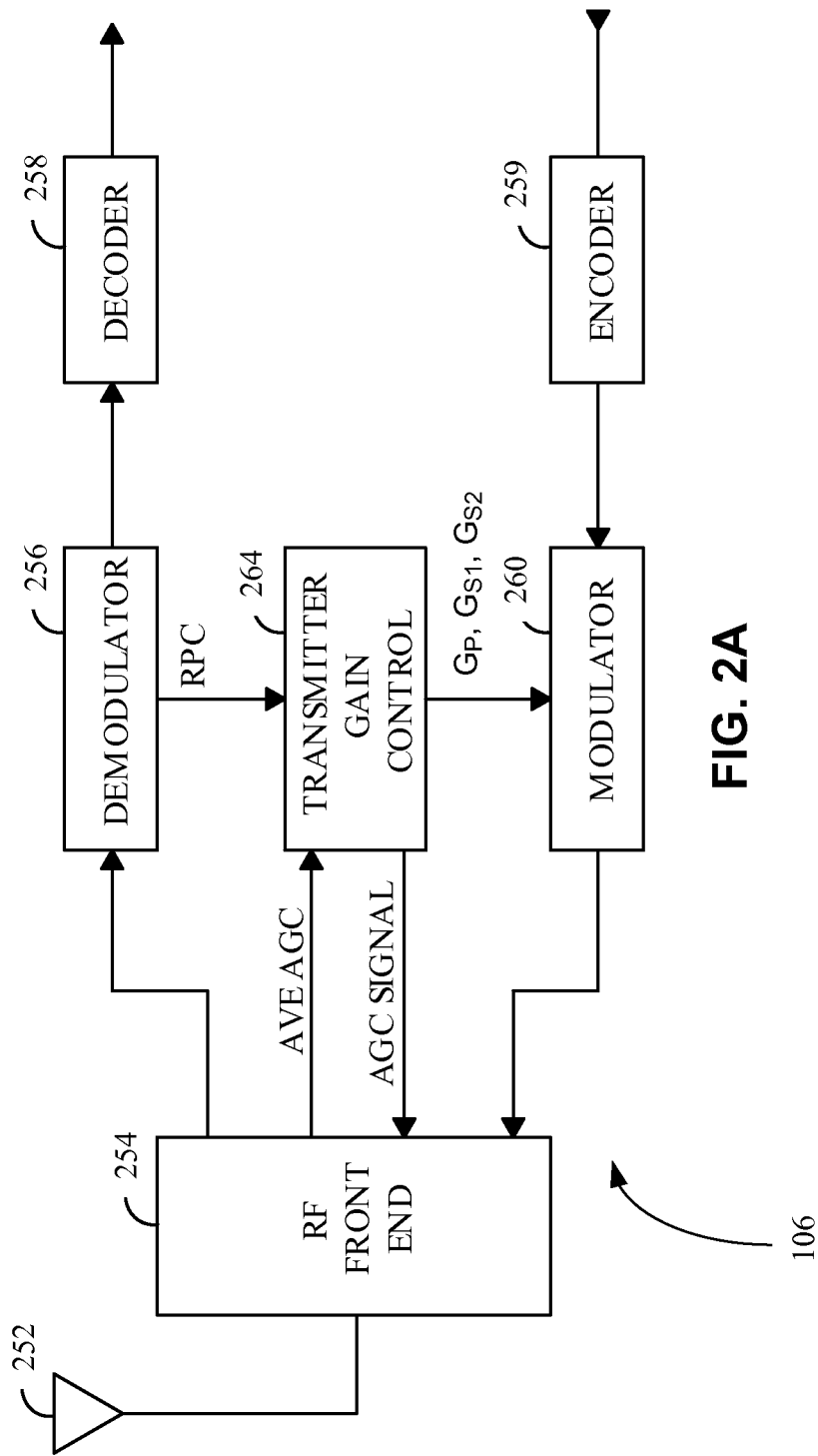
FIG. 2A is a functional block diagram of an exemplary subscriber station adapted for operation in a CDMA communication system.

A functional block diagram of an exemplary subscriber station 106 operating in an HDR communications system is shown in FIG. 2A. The exemplary subscriber station 106 includes a receiver and a transmitter both coupled to an antenna 252. The receiver includes an RF front end 254, a demodulator, 256 and a decoder 258. The transmitter includes an encoder 259, a modulator 260, and shares the RF front end 254 with the receiver. The transmitter also includes a transmitter gain control 264 to control the reverse link transmission power in a manner to be discussed in greater detail later.

The RF front end 254 is coupled to the antenna 252. The receiver portion of the front end 254 downconverts, filters, amplifies and digitizes a signal received by the antenna 252.

The receiver portion of the RF front end 254 also includes an AGC (not shown) to maximize the dynamic range of the digitized signal. The AGC can be utilized by the transmitter gain control 264 to compute the path loss between the base station 160 and the subscriber station during the open loop power control estimation. The digitized signal from the receiver portion of the RF front end 204 can then be coupled to the demodulator 206 where it is quadrature demodulated with short PN codes, decovered by Walsh codes, and descrambled using a long PN code. The demodulated signal can then be provided to the decoder 258 for forward error correction. The demodulator 256 can also be used to extract the RPC command from the forward link transmission and provide it to the transmitter gain control 264 for closed loop power control computations.

The transmitter includes the encoder 259 which typically provides convolution coding and interleaving of the reverse link traffic channel. The encoded primary reverse carrier is provided to the modulator 260 where it is spread with a Walsh cover and amplified by a primary carrier ($G_P$) computed by the transmitter gain control 264. Two secondary reverse carriers, S1 ... SN, are also provided to the modulator 260 where they are each spread with a different Walsh cover and amplified by respective channel gains ($G_{S1}$), and ($G_{SN}$) computed by the transmitter gain control 264. The channels are then combined, spread with a long PN code and quadrature modulated with short PN codes. The quadrature modulated signal is provided to the transmitter portion of the RF front end 254 where it is upconverted, filtered, and amplified for over the air forward link transmission through the antenna 252. The amplification of the quadrature modulated signal in the transmitter portion of the RF front end 254 is controlled by an AGC signal from the transmitter gain control 264.

Figure 2B:
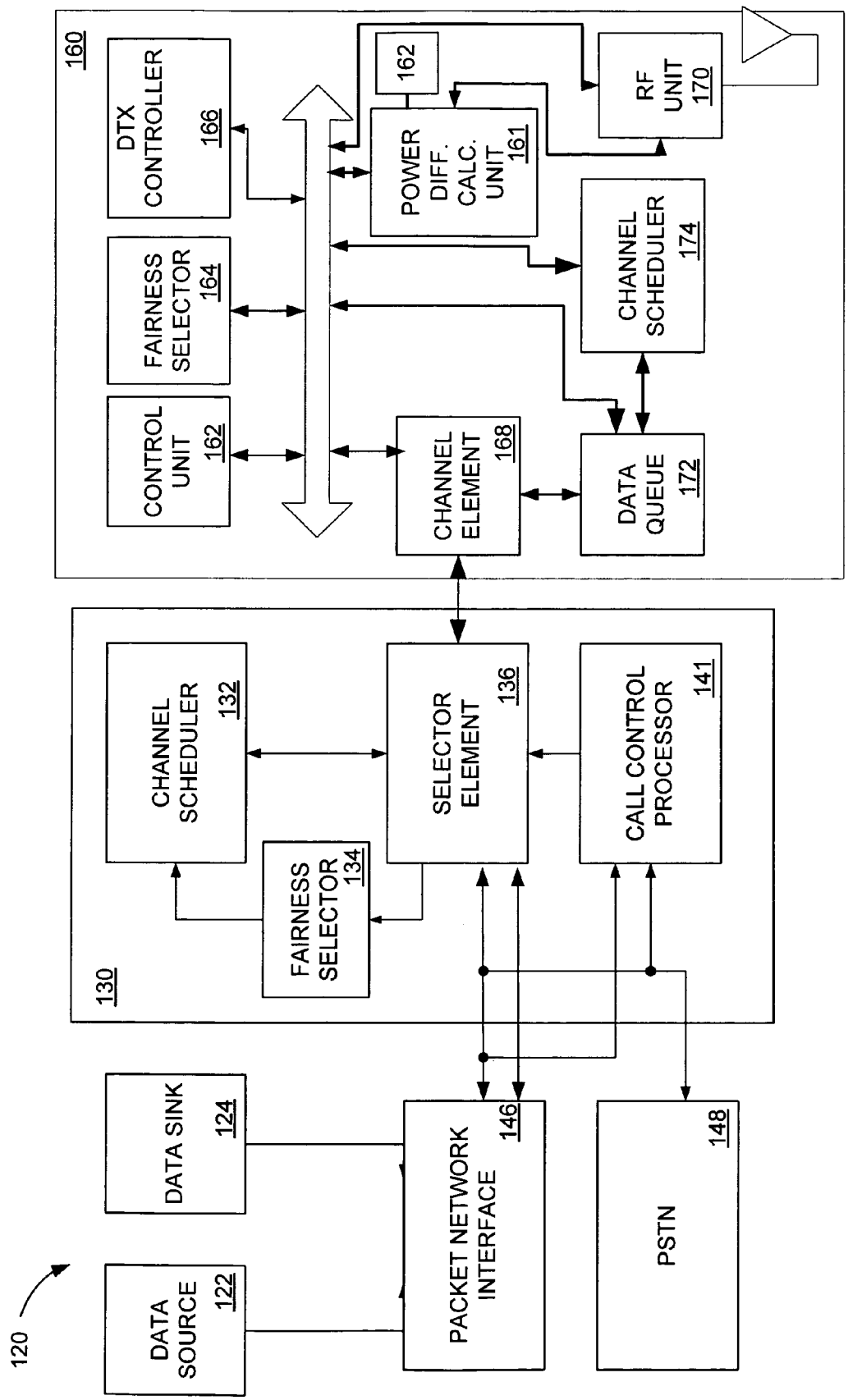
FIG. 2B is a portion of a communication system, including a base station controller and a base station.

One example of a communication system supporting HDR transmissions and adapted for scheduling transmissions to multiple users is illustrated in FIG. 2B. FIG. 2B is detailed hereinbelow, wherein specifically, a base station 160 and base station controller 130 interface with a packet network interface 146. Base station controller 130 includes a channel scheduler 132 for implementing a scheduling algorithm for transmissions in system 120. The channel scheduler 132 determines the length of a service interval during which data is to be transmitted to any particular remote station based upon the remote station's associated instantaneous rate for receiving data (as indicated in the most recently received DRC signal). The service interval may not be contiguous in time but may occur once every n slots. According to one embodiment, the first portion of a packet is transmitted during a first slot at a first time and the second portion is transmitted 4 slots later at a subsequent time. Also, any subsequent portions of the packet are transmitted in multiple slots having a similar 4 slots spread, i.e., 4 slots apart from each other. According to an embodiment, the instantaneous rate of receiving data Ri determines the service interval length Li associated with a particular data queue.

In addition, the channel scheduler 132 selects the particular data queue for transmission. The associated quantity of data to be transmitted is then retrieved from a data queue 172 and provided to the channel element 168 for transmission to the remote station associated with the data queue 172. As discussed below, the channel scheduler 132 selects the queue for providing the data, which is transmitted in a following service interval using information including the weight associated with each of the queues. The weight associated with the transmitted queue is then updated.

Base station controller 130 interfaces with packet network interface 146, Public Switched Telephone Network (PSTN), 148, and all base stations in the communication system (only one base station 160 is shown in FIG. 2B for simplicity). Base station controller 130 coordinates the communication between remote stations in the communication system and other users connected to packet network interface 146 and PSTN 148. PSTN 148 interfaces with users through a standard telephone network (not shown in FIG. 2B).

Base station controller 130 contains many selector elements 136, although only one is shown in FIG. 2B for simplicity. Each selector element 136 is assigned to control communication between one or more base stations 160 and one remote station (not shown). If selector element 136 has not been assigned to a given remote station, call control processor 141 is informed of the need to page the remote station. Call control processor 141 then directs base station 160 to page the remote station.

Data source 122 contains a quantity of data, which is to be transmitted to a given remote station. Data source 122 provides the data to packet network interface 146. Packet network interface 146 receives the data and routes the data to the selector element 136. Selector element 136 then transmits the data to each base station 160 in communication with the target remote station. In the exemplary embodiment, each base station 160 maintains a data queue 172, which stores the data to be transmitted to the remote station.

The data is transmitted in data packets from data queue 172 to channel element 168. In the exemplary embodiment, on the forward link, a "data packet" refers to a quantity of data which is a maximum of 1024 bits and a quantity of data to be transmitted to a destination remote station within a predetermined "time slot" (such as ≈1.667 msec). For each data packet, channel element 168 inserts the necessary control fields. In the exemplary embodiment, channel element 168 performs a Cyclic Redundancy Check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The forward link signal is transmitted over the air through an antenna to the forward link.

At the remote station 106, the forward link signal is received by an antenna and routed to a receiver. The receiver filters, amplifies, quadrature demodulates, and quantizes the signal. The digitized signal is provided to a demodulator (DEMOD) where it is despread with the short PNI and PNQ codes and decovered with the Walsh cover. The demodulated data is provided to a decoder which performs the inverse of the signal processing functions done at base station 160, specifically the de-interleaving, decoding, and CRC check functions. The decoded data is provided to a data sink.

The hardware, as pointed out above, supports variable rate transmissions of data, messaging, voice, video, and other communications over the forward link. The rate of data transmitted from the data queue 172 varies to accommodate changes in signal strength and the noise environment at the remote station 106. Each of the remote stations 106 preferably transmits a Data Rate Control (DRC) signal to an associated base station 160 at each time slot. The DRC signal provides information to the base station 160, which includes the identity of the remote station 106 and the rate at which the remote station is to receive data from its associated data queue. Accordingly, circuitry at the remote station 106 measures the signal strength and estimates the noise environment at the remote station 106 to determine the rate information to be transmitted in the DRC signal.

The DRC signal transmitted by each remote station travels through a reverse link channel and is received at base station 160 through a receive antenna coupled to RF unit 170. In the exemplary embodiment, the DRC information is demodulated in channel element 168 and provided to a channel scheduler 132 located in the base station controller 130 or to a channel scheduler 174 located in the base station 160. In a first exemplary embodiment, the channel scheduler 174 is located in the base station 160. In an alternate embodiment, the channel scheduler 132 is located in the base station controller 130, and connects to all selector elements 136 within the base station controller 130.

The FL transmission formats compatible with each DRC index are listed for sets of protocol subtypes defined in the 1xEV-DO Rel-0 and Revisions A and B specifications, respectively, including proposed changes in recent contributions to Rev-A that defined compatible multi-user formats for DRC indices of 0x0, 0x1, and 0x2. A transmission format, as in the Rev. A specification, is represented by the triplet (PacketSize, Span, PreambleLength). "PacketSize" is the number of bits the transmission format carries including Cyclic Redundancy Code (CRC) and tail. "Span" is the nominal (e.g., maximum) number of slots which a transmission instance would take up on the forward link. The "PreambleLength" is the total number of preamble chips. As in the Revision A of 1xEV-DO specification, "canonical" transmission formats for each DRC are indicated in bold. Note, Rel-0 defines only single-user transmission formats, whereas certain subtypes in Revisions A and B define both single-user and multi-user formats. In addition, in Revisions A and B, multiple transmission formats may be defined for each DRC index. The AT 106 tries to receive packets at each of these formats. The multi-user formats are distinguished by their unique MAC indices, i.e., the preamble for each multi-user format uses a distinct Walsh cover. The single-user formats all use the MAC index assigned to a user.

As a reminder, a transmission instance refers to a transmission format with a particular set of bits from one or more queues selected to be transported by it. A candidate transmission instance refers to a transmission instance to be evaluated by a scheduler algorithm for possible transmission. The multi-user transmission formats (1024,4,256), (2048,4,128), (3072,2,64), (4096,2,64), and (5120,2,64) are referred to as the canonical multi-user transmission formats. The multi-user transmission formats (128,4,256), (256,4,256), and (512,4,256) are referred to as "non-canonical multi-user formats." The derived transmission formats are obtained simply by setting the span of the corresponding defined format to smaller values than the nominal value (as if obtained from the defined formats by early termination). In summary, transmission formats and instances may be canonical or non-canonical; single-user, or multi-user; and defined or derived. The term "nominal number of slots" will be used to refer to the maximum number of slots for a defined transmission format and the redefined maximum number of slots for a derived transmission format.

In a system supporting link adaptation for high speed packet data transmissions, and supporting an ever increasing number of users, each having specific desired transmissions and criteria, it may be desirable provide an even larger number of DRC indices. This adds to the granularity of data rates, allowing for rates between existing or current designated rates. Further, allowing expanded DRC indices list allows for a finer granularity in determining FL data rates, and therefore may allow higher peak data rates, and improve Hybrid ARQ (H-ARQ) gain.

Figure 3:
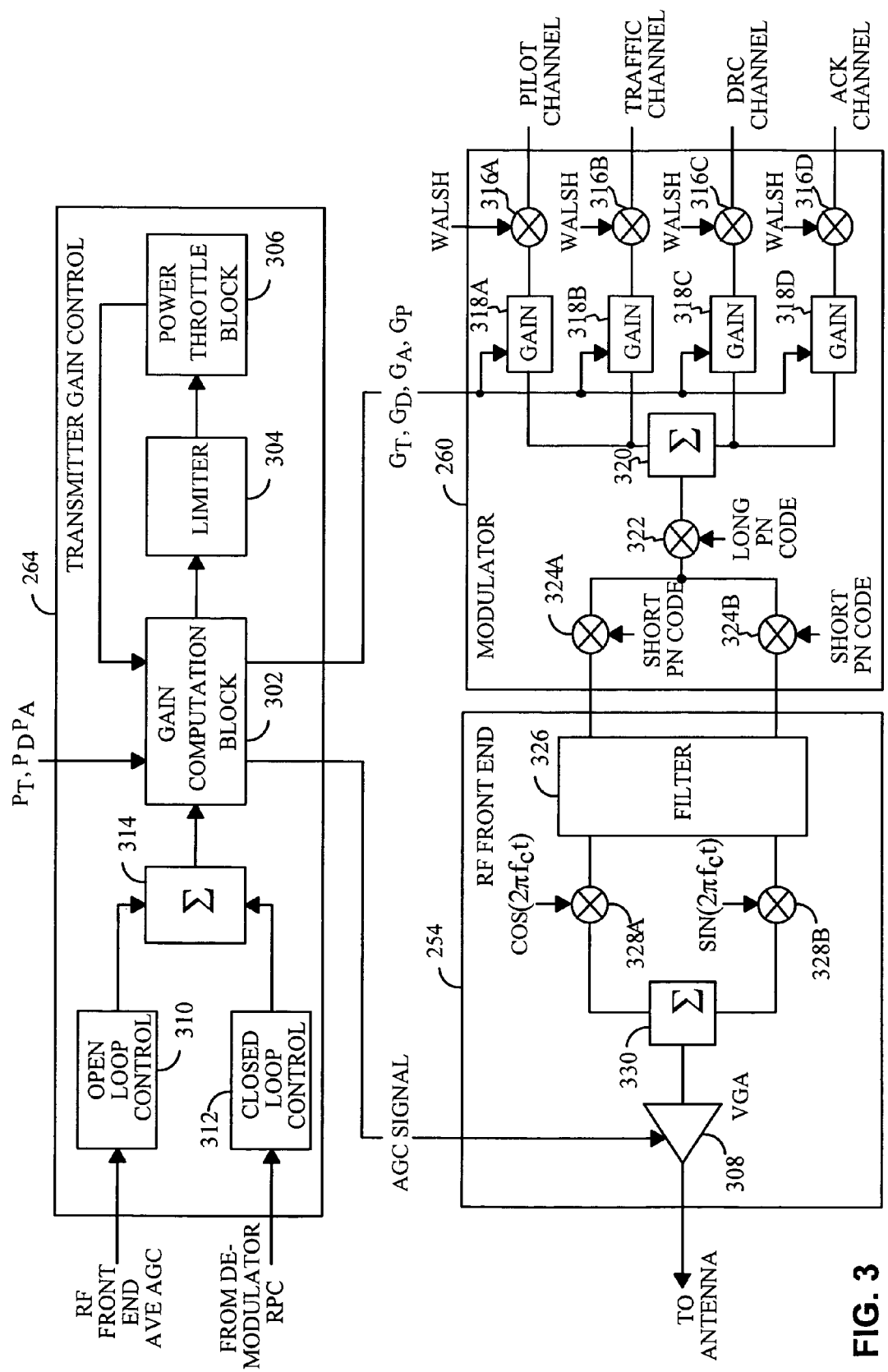
FIG. 3 is a functional block diagram of an exemplary transmitter gain control and transmitter from the subscriber station of FIG. 1B.

A functional block diagram of an exemplary transmitter gain control 264, modulator 260 and transmitter portion of the RF front end 254 is shown in FIG. 3. The transmitter gain control 264 includes a power and gain computation block 302 for computing the gains for the primary and secondary carriers as discussed below. For example, as discussed below, gain computations for each secondary link carrier may be based on a power differential between each secondary link carrier and the primary link carrier.

The carrier gains may then be "throttled" or "backed off" or "increased." The feedback loop includes a limiter 304 and a power throttle block 306. The limiter 304 determines whether the total reverse link transmission power resulting from the predetermined power ratios exceeds the maximum power capability of the transmitter. The maximum power capability of the transmitter is limited by a variable gain amplifier (VGA) 308 and a power amplifier (not shown) in the RF front end 254.

The transmitter gain control 264 can be implemented with a variety of technologies including, by way of example, embedded communications software. The embedded communications software can be run on a programmable digital signal processor (DSP). Alternatively, the transmitter gain control 264 can be implemented with a general purpose processor running a software program, an application specific integrated circuit (ASIC), a field programmable gate array (FPGA) or other programmable logic device, discrete gate or transistor logic, discrete hardware components, or any combination thereof.

Referring back to FIG. 3, the carrier gains computed by the power and gain computation block 302 can be coupled to the modulator 260. The modulator 260 includes a mixer 316B which is used to spread the encoded first secondary carrier from the encoder with a Walsh function. The primary, second secondary, and nth secondary carriers are also provided to mixers 316A, 316C, and 316D, respectively, where they are each spread with a different Walsh cover. The Walsh covered carriers are provided to gain elements 318A-D, respectively, where their respective gains computed by the power and gain computation block 302 are applied. The output of the gain elements 318a-d are provided to a summer 320. The combined channels are then coupled to a mixer 322 where they are spread using the long PN code. The spread channels are then split into a complex signal having an in-phase (I) component and a quadrature phase (Q) component. The complex signal is quadrature modulated with the short PN codes by mixers 324A and 324B before being output to the transmitter portion of the RF front end 254.

A complex baseband filter 326 is positioned at the input to the RF front end 254 to reject out of band components of the quadrature modulated signal. The filtered complex signal is provided to quadrature mixers 328A and 328B where it is modulated onto a carrier waveform before being combined by a summer 330. The combined signal is then provided to the VGA 308 to control the power of the reverse link transmission through the antenna. An AGC signal from the power and gain computation block 302 is used to set the gain of the VGA 308.

Figure 4:
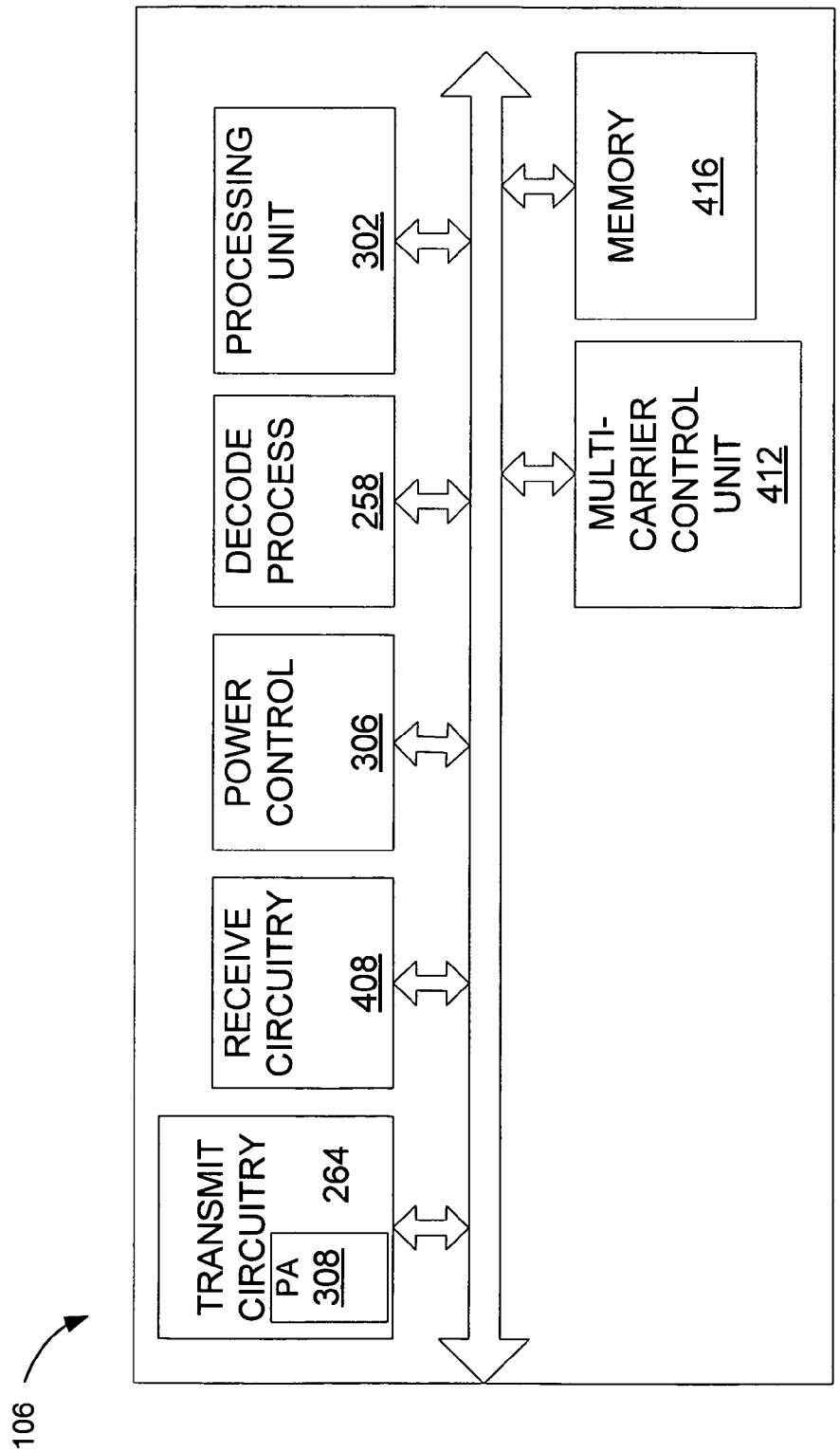
FIG. 4 illustrates an embodiment of an Access Terminal (AT) according to the present patent application.

FIG. 4 illustrates another embodiment of an AT 106 according to the present patent application in which the AT 106 includes transmit circuitry 264 (including PA 308), receive circuitry 408, power control unit 306, decode process unit 258, processing unit 302, multi-carrier control unit 412 and memory 416. A portion of the power control unit 306 may be further illustrated in FIG. 6A, wherein a comparator 200 receives a primary FL carrier receive power level and a secondary FL carrier receive power level. The comparator 200 determines a differential value between the two (or multiple) levels. The differential value is provided to a secondary carrier transmit power level calculation unit 202. Further, power differential control information is provided to unit 202 and is used to generate a secondary carrier transmit power level.

In the prior art, when the reverse link is comprised of multiple carriers, access probes are still transmitted on a single reverse link carrier, wherein the AT 106 may request additional or second reverse link carrier(s) from the AN 120. The AN 120 then assigns additional reverse link carrier(s) to the AT 106. As the AT 106 may not send access probes for secondary reverse link carriers, there is a need to determine a power level for transmission from the AT 106 on the additional or secondary reverse link carrier(s). That is, when additional reverse link carriers (i.e., secondary reverse link carriers) are added to the access network 120, access terminals 106 in the prior art do not send access probes for secondary reverse link carriers to determine the initial transmit power level for each secondary reverse link carrier. Thus, what power level should the mobile 106 use to transmit the pilot for a secondary carrier when initially transmitting using that secondary reverse link carrier?

Proposed solutions are described in exemplary embodiments below, the power differences between the primary forward and secondary forward carriers may be used to determine how far to adjust the secondary reverse link carrier power with respect to the primary reverse link carrier power. Channel conditions for the secondary reverse link carrier may vary when compared to channel conditions for the primary reverse link carrier. Thus, the power levels of the secondary reverse link carrier power may need to be adjusted with respect to the primary reverse link carrier power.

In a first embodiment, the AT 106 uses a power level differential of the secondary reverse link carrier relative to the power level of the primary reverse link carrier to compute the power level of the corresponding secondary reverse link carrier. The power level of each secondary reverse link carrier pilot is set equal to the power level of the primary reverse link carrier pilot plus this differential. (In EV-DO, once the pilot transmit power is known, the transmit power level of the remainder of the channel is known because other signals are transmitted with predetermined gain settings relative to that of the pilot transmit power). From that initial point on, the power levels of pilot channel for each reverse link carrier is independently controlled. That is, once the AT 106 starts transmitting the pilot on the secondary carrier, the secondary carrier's pilot is independently power controlled thereon. In this way, the AT 106 determines the initial transmit power of the secondary carrier from the current power level of the primary carrier and uses this until power control calculations may be made independently by and for the secondary carrier.

Figure 5:
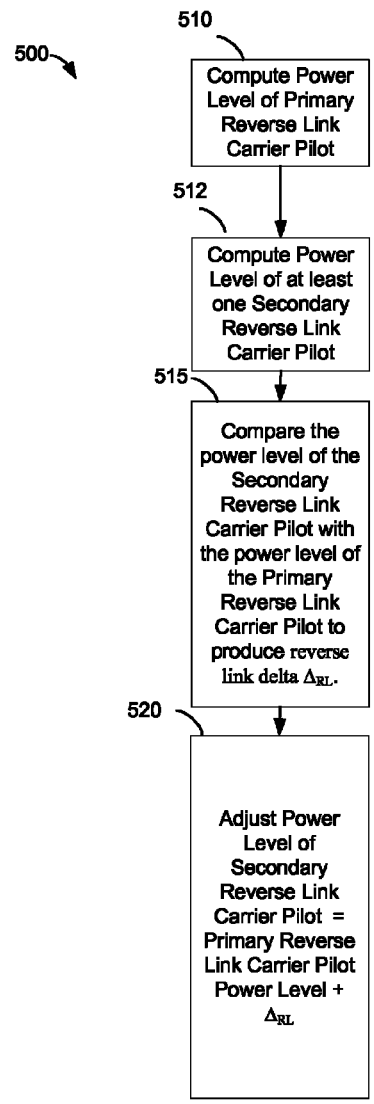
FIG. 5 is a flow chart illustrating the steps executed when the power level of a secondary reverse link carrier is set based on a differential between the primary and the secondary reverse link carrier pilot power levels.

This point is illustrated in flowchart 500 illustrated in FIG. 5. Compute the power level of the primary reverse link carrier pilot (Step 510) and compute the power level of the secondary reverse link carrier pilot (Step 512). Next, compare the power level of the secondary reverse link carrier pilot with the power level of the primary reverse link carrier pilot (step 515), whereby a difference between the primary reverse link carrier pilot and the secondary reverse link carrier pilot is generated. This difference between the primary reverse link carrier power, ($P_{PRL}$), and the secondary reverse link carrier power, ($P_{SRL}$), may be referred to as a reverse link delta $\Delta_{RL}$. The power level of the secondary reverse link carrier pilot, ($P_{SRL}$), is then adjusted to equal the power level of the primary reverse link carrier pilot, ($P_{PRL}$), and $\Delta_{RL}$. (Step 520).

$$(P_{SRL}) = (P_{PRL}) + \Delta_{RL} \qquad \text{Eq. 1}$$

where $|P_{SRL} - P_{(S\pm1)RL}| < Z_{db}$, $Z_{db}$ represents the transmit power differential between two adjacent carriers and ($P_{(S\pm1)RL}$) represents another secondary reverse link carrier pilot adjacent to the secondary reverse link carrier pilot, ($P_{SRL}$).

Pilot transmit powers are determined because in 1xEV-DO, once pilot channel transmit power is known, the transmit power level of the remainder of the channels is known. The reason is because the other channels are transmitted with predetermined gain settings relative to that of the pilot channel transmit power.

In a second embodiment, the access terminal 106 uses a computed power level differential of the secondary forward link carrier relative to the power level of the primary forward link carrier to compute the power level of the corresponding secondary reverse link carrier. Thus, the secondary reverse link carrier initial pilot channel transmit power level is determined according to a differential between the primary and secondary FL carriers.

Figure 6A:
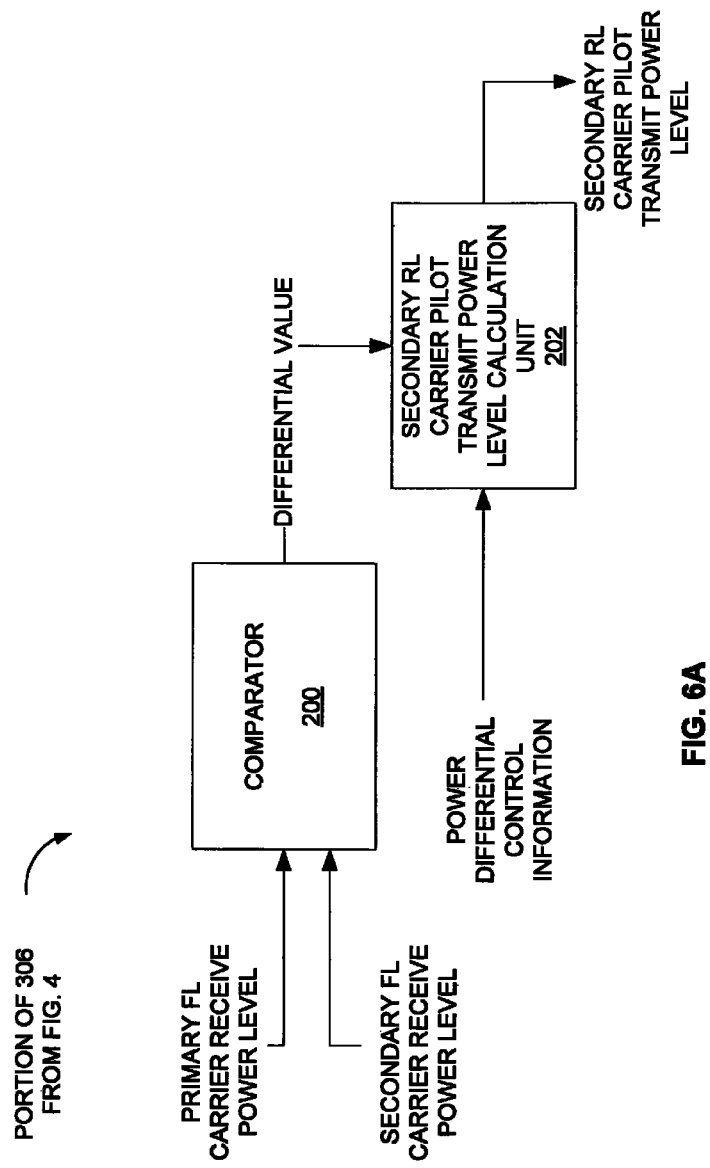
FIG. 6A is an apparatus for calculating transmit power levels for a FL carrier in a multi-carrier system.

Such differential may be calculated by comparing the receive power levels of the two forward link carriers. (As stated above, the difference in channel conditions between the primary and secondary forward link carriers may be indicative of difference in the channel conditions between the primary and secondary reverse link carriers). As illustrated in FIG. 6A, describing a portion of 306 from FIG. 4, a comparator 200 receives a primary FL carrier receive power level and a secondary FL carrier receive power level. The comparator 200 compares the two levels and generates a differential value. This difference between the primary forward link carrier power and the secondary forward link carrier may be referred to as a forward link delta $\Delta_{FL}$. The differential value is then provided to a secondary RL carrier pilot transmit power level calculation unit 202, which also receives power differential control information. The secondary RL carrier pilot transmit power level calculation unit 202 then generates a secondary RL carrier pilot transmit power level. In one embodiment, the secondary carrier forward link receive pilot power is compared to the primary forward link receive power. For example, if the secondary forward link power is 20 db less than the primary forward link power (−20 db), then a differential value of +20 db is output by comparator 200. This means that the secondary carrier pilot power is adjusted to be +20 db higher compared to the primary reverse link carrier pilot power to compensate for the extra 20 of loss in the secondary's channel when compared to the primary's channel. This is illustrated in equation 2.

$$(P_{SRL}) = (P_{PRL}) + \Delta_{FL} \qquad \text{Eq. 2}$$

where $|P_{SRL} - P_{(S\pm1)RL}| < Z_{db}$, $Z_{db}$ represents the transmit power differential between two adjacent carriers and ($P_{(S\pm1)RL}$) represents another secondary reverse link carrier pilot adjacent to the secondary reverse link carrier pilot, ($P_{SRL}$).

Furthermore, in addition to using the difference between primary and secondary on the forward link, the present method and apparatus may use the difference between the primary pilot power and the secondary pilot power on the reverse link, i.e., reverse link delta $\Delta RL$. This is illustrated in equation 3.

$$(P_{SRL}) = (P_{PRL}) + \Delta_{FL} + \Delta_{RL} \qquad \text{Eq. 3}$$

where $|P_{SRL} - P_{(S\pm1)RL}| < Z_{db}$, $Z_{db}$ represents the transmit power differential between two adjacent carriers and ($P_{(S\pm1)RL}$) represents another secondary reverse link carrier pilot adjacent to the secondary reverse link carrier pilot, ($P_{SRL}$).

Figure 6B:
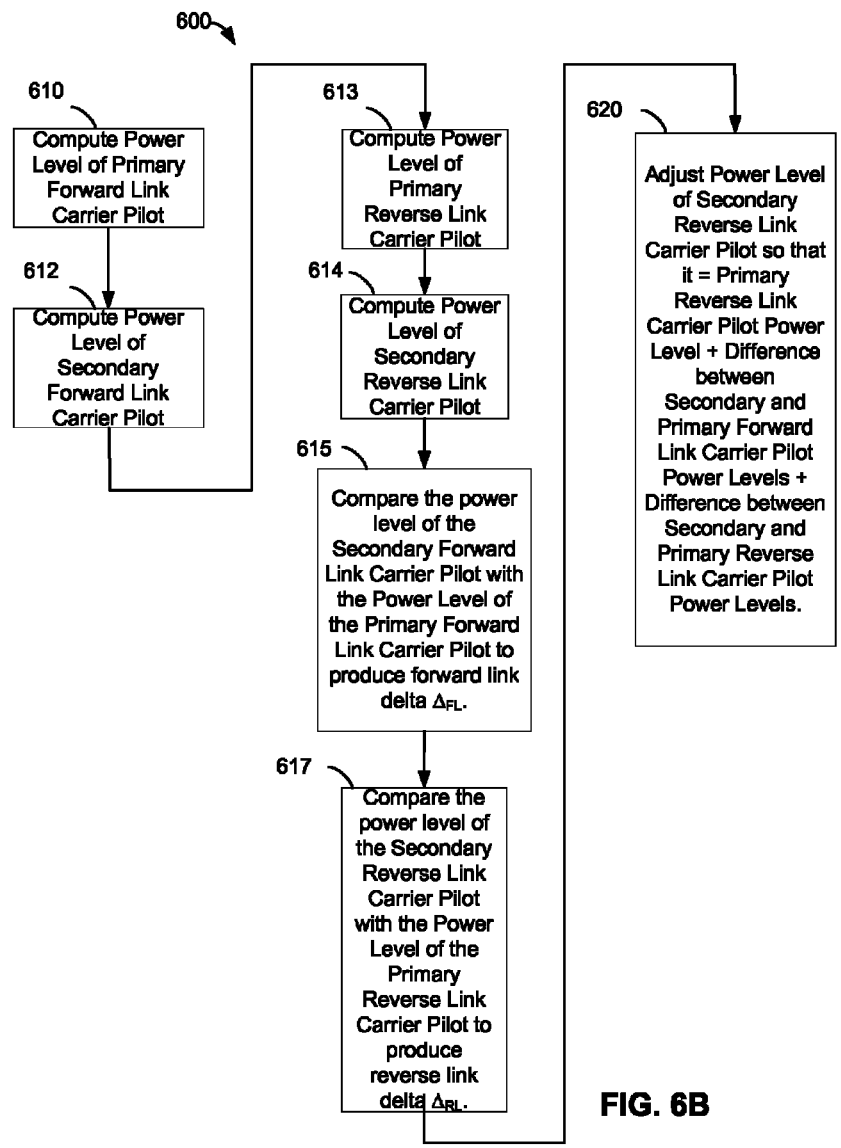
FIG. 6B is a flow chart illustrating setting a secondary reverse link carrier pilot power level based on a differential between the primary and the secondary forward link carrier pilot power levels and a differential between the primary and the secondary reverse link carrier pilot power levels.

This point is illustrated in flowchart 600 illustrated in FIG. 6B. Compute the power level of the primary forward link carrier pilot (Step 610) and compute the power level of the secondary forward link carrier pilot (Step 612). Also, compute the power level of the corresponding primary and secondary reverse link carrier pilots (Steps 613 and 614 respectively). Next, compare the power level of the secondary forward link carrier pilot with the power level of the primary forward link carrier pilot (step 615), whereby a difference between the primary forward link carrier pilot and the secondary forward link carrier pilot is generated. This difference between the primary forward link carrier power, ($P_{PFL}$), and the secondary forward link carrier, ($P_{SFL}$), may be referred to as a forward link delta $\Delta_{FL}$.

Likewise, compare the power level of the secondary reverse link carrier pilot with the power level of the primary reverse link carrier pilot (step 617), whereby a difference between the primary reverse link carrier pilot and the secondary reverse link carrier pilot is generated. This difference between the primary forward link carrier power, ($P_{PRL}$), and the secondary forward link carrier, ($P_{SPL}$), may be referred to as a reverse link delta $\Delta_{RL}$.

The power level of the secondary reverse link carrier pilot, ($P_{SRL}$), is then adjusted to equal the power level of the primary reverse link carrier pilot, ($P_{PRL}$), and $\Delta_{FL}$ and $\Delta_{RL}$. (Step 620).

The rationale behind this approach is that in a situation where the conditions on the forward and the reverse link are similar, the differential in power on the forward link is proportional to (or indicative of) the differential in power on the reverse link. In theory, if the conditions on the RL equals the conditions on the FL, then the proportionality factor is 1.

In a third method, a reverse link load differential, such as an average rise-over-thermal (RoT) differential, between the primary reverse link and secondary reverse link may indicate what the reverse link power differentials are, i.e., a difference between the primary and secondary reverse link carriers. The rise-over-thermal differential is measured by the AN 120 and then sent to the AT 106, which uses it to adjust the power level of the secondary reverse link carriers and can be used instead of the reverse link delta $\Delta_{RL}$ used above.

In a CDMA wireless system, the reverse link capacity is interference-limited. One measure of the cell/sector congestion is the total received power at the base station 160. A ratio of the total received power at the base station 160 to the thermal noise gives a normalized measure of the congestion and is referred to as rise-over-thermal (RoT). The RoT at a sector is defined as the ratio of total received power to thermal noise power. It is a measure of congestion in the system. In one embodiment, the RoT is kept ≤5 dB. This quantity is readily measurable and self-calibrating, and provides an estimate of the interference seen by each AT 106. The following is a formula used to compute RoT.

$RoT = (N_0 + \Sigma \hat{E}_C)/N_0$, where $N_0$ equals thermal noise, $\hat{E}_C$ represents user signal and $\Sigma \hat{E}_C$ is the summation of all user signals. Eq. 4.

Figure 7:
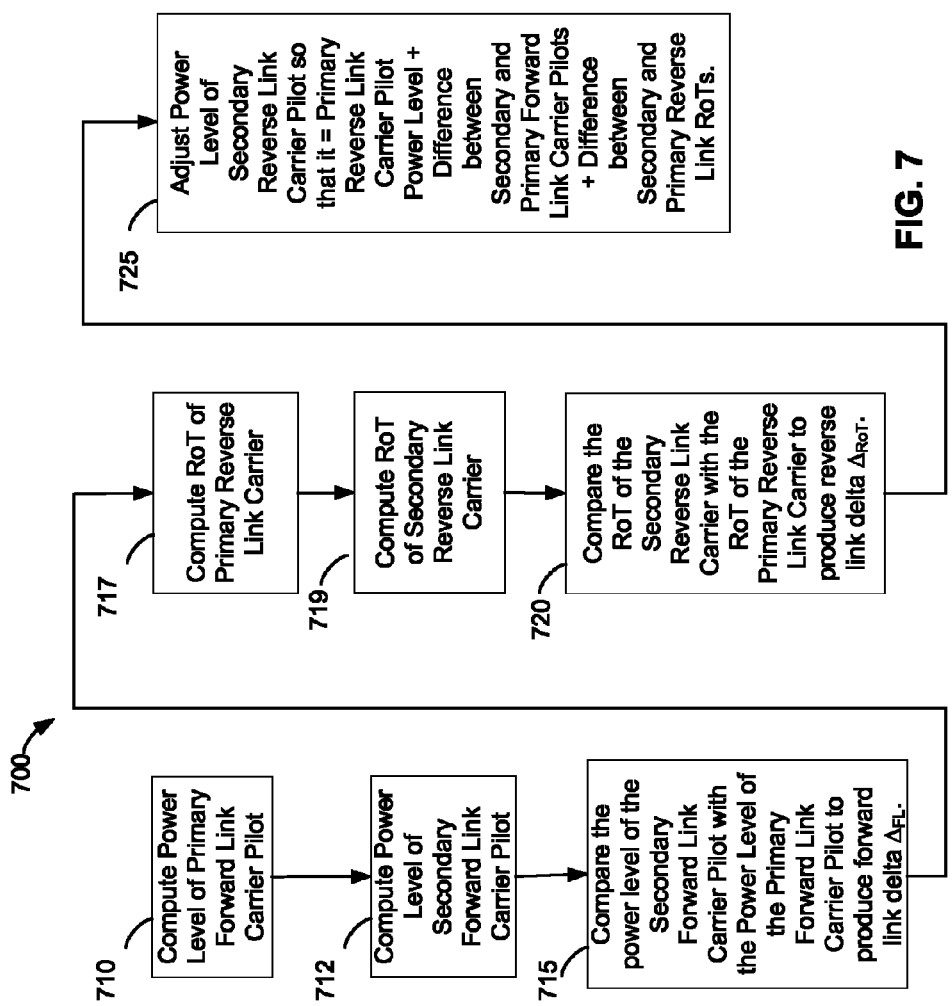
FIG. 7 is a flowchart illustrating setting a secondary reverse link carrier based on a differential between the primary and the secondary reverse link carrier rise-over-thermals and a differential between the primary and the secondary forward link carrier pilot power levels.

Use of the RoT is illustrated in flowchart 700 illustrated in FIG. 7. Compute the power level of the primary forward link carrier pilot (Step 710) and compute the power level of the secondary forward link carrier pilot (Step 712). Next, compare the power level of the secondary forward link carrier pilot with the power level of the primary forward link carrier pilot (step 715), whereby a difference between the primary forward link carrier pilot and the secondary forward link carrier pilot is generated. This difference between the primary forward link carrier power, ($P_{PFL}$), and the secondary forward link carrier, ($P_{SFL}$), may be referred to as a forward link differential or delta $\Delta_{FL}$.

Likewise, the access network 120 computes the RoT of the primary reverse link carrier (Step 717). Next, the access network 120 computes the RoT of the secondary reverse link carrier (Step 719). The access network 120 then compares the RoT of the primary reverse link carrier and the RoT of the secondary reverse link carrier producing a delta of the RoTs, reverse link delta $\Delta_{RoT}$, and sends this RoT differential to the AT 106 (Step 720).

The power level of the secondary reverse link carrier pilot, ($P_{SRL}$), is then adjusted to equal the power level of the primary reverse link carrier pilot, ($P_{PRL}$), and $\Delta_{FL}$ and $\Delta_{RoT}$. (Step 725). This is illustrated in equation 5.

$$(P_{SRL}) = (P_{PRL}) + \Delta_{FL} + \Delta_{RoT} \quad \text{Eq. 5}$$

where $|P_{SRL} - P_{(S\pm1)RL}| < Z_{db}$, $Z_{db}$ represents the transmit power differential between two adjacent carriers and ($P_{(S\pm1)RL}$) represents another secondary reverse link carrier pilot adjacent to the secondary reverse link carrier pilot, ($P_{SRL}$).

In addition, other indications of reverse link load differentials may be used in addition to the average rise-over-thermal differential on the reverse link. For example, another variant of RoT is the total cell-load. The cell-load contribution due to each access terminal 106 in communication with the base station 160 may be measured by the signal-to-interference power ratio.

In another embodiment, other metrics beside the rise-over-thermal (RoT) may be used to adjust the power level of the secondary reverse link carrier pilot. For example, an interference over thermal (IoT) may be used. An IoT represents interference from other cells which may not be canceled.

Figure 8A:
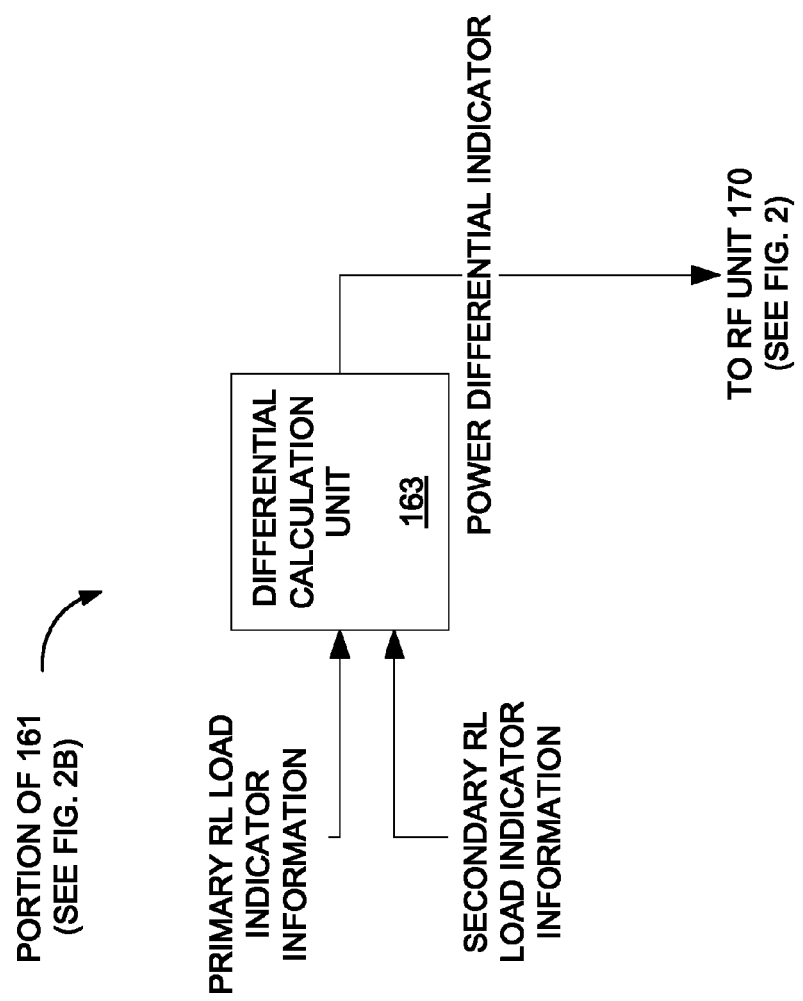
FIG. 8A is an apparatus for calculating a reverse link load differential.

In one embodiment, the base station 160 of FIG. 2B further includes a power differential calculation unit 161 coupled to RF Unit 170, wherein the calculation unit 161 determines a power differential indicator which is transmitted to an AT 106. FIG. 8A further details operation of the power differential calculation unit 161, wherein a differential calculation unit 163 receives reverse load information on the primary carrier and secondary carrier reverse links. The differential calculation unit 163 then determines a power differential indicator. The power differential indicator is provided to the RF Unit 170 for transmission to an AT 106. A component of the AN 120, such as at base station 160, may use a variety of differential indicator information. Such information may include, but is not limited to, an average rise-over-thermal differential between the primary and secondary RL carriers; or may include another indication of a reverse link load differential. The AT 106 receives the power differential indicator from the AN 120. The AT 106 determines a forward link power differential for signals received on the primary and secondary FL carriers. The AT 106 then uses this forward link receive power differential and the power differential indicator from the AN 120 to determine the reverse link transmit power for a secondary RL carrier pilot.

Figure 8B:
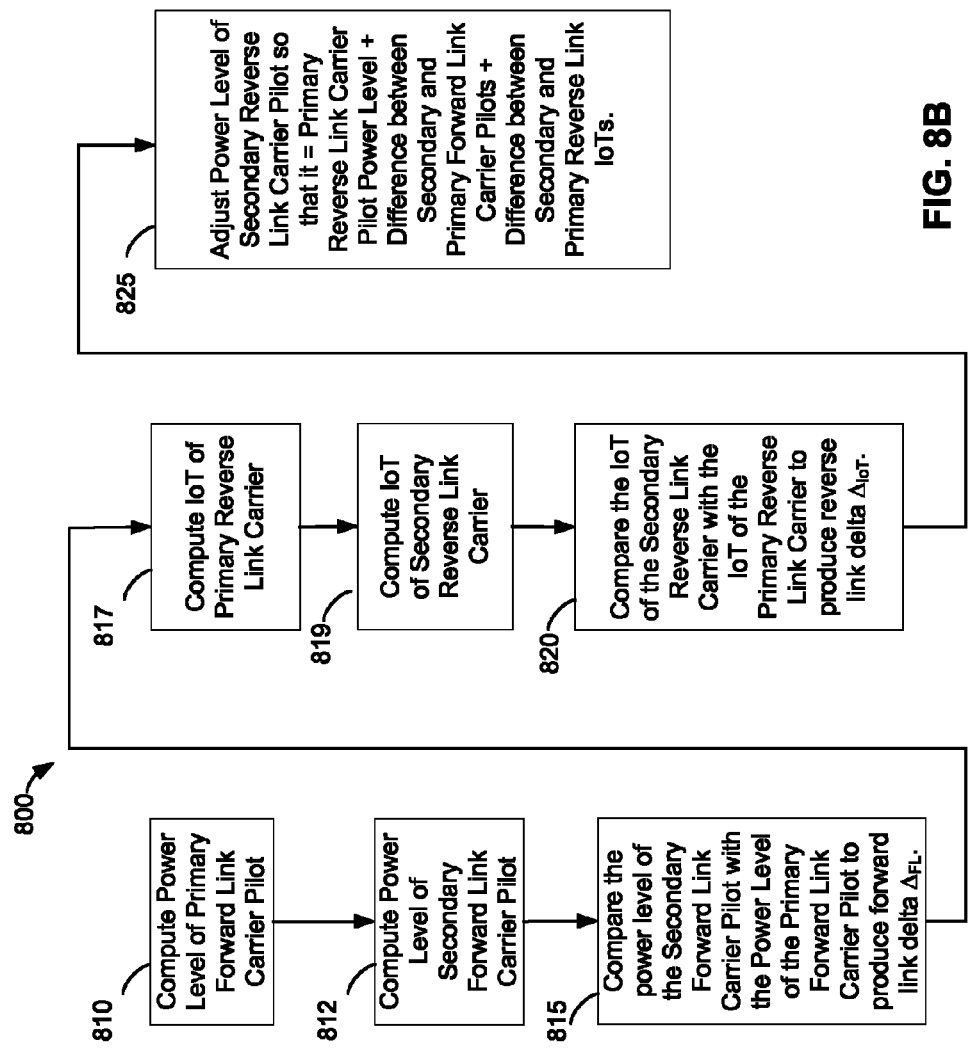
FIG. 8B is a flowchart illustrating setting a secondary reverse link carrier based on a differential between the primary and the secondary forward link carrier power levels and on a differential between the primary and the secondary reverse link carrier interference-over-thermals.
Figure 9:
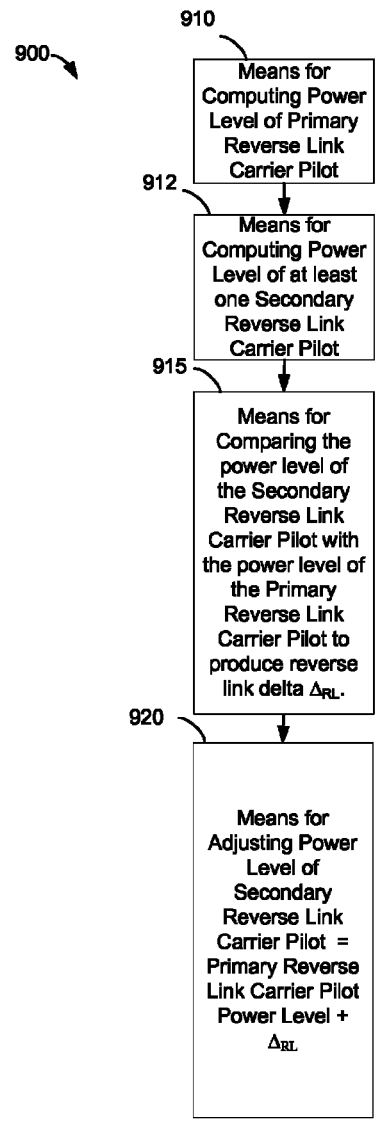
FIG. 9 is a functional block diagram illustrating the means for setting the power level of a secondary reverse link carrier based on a differential between the primary and the secondary reverse link carrier pilot power levels.
Figure 10:
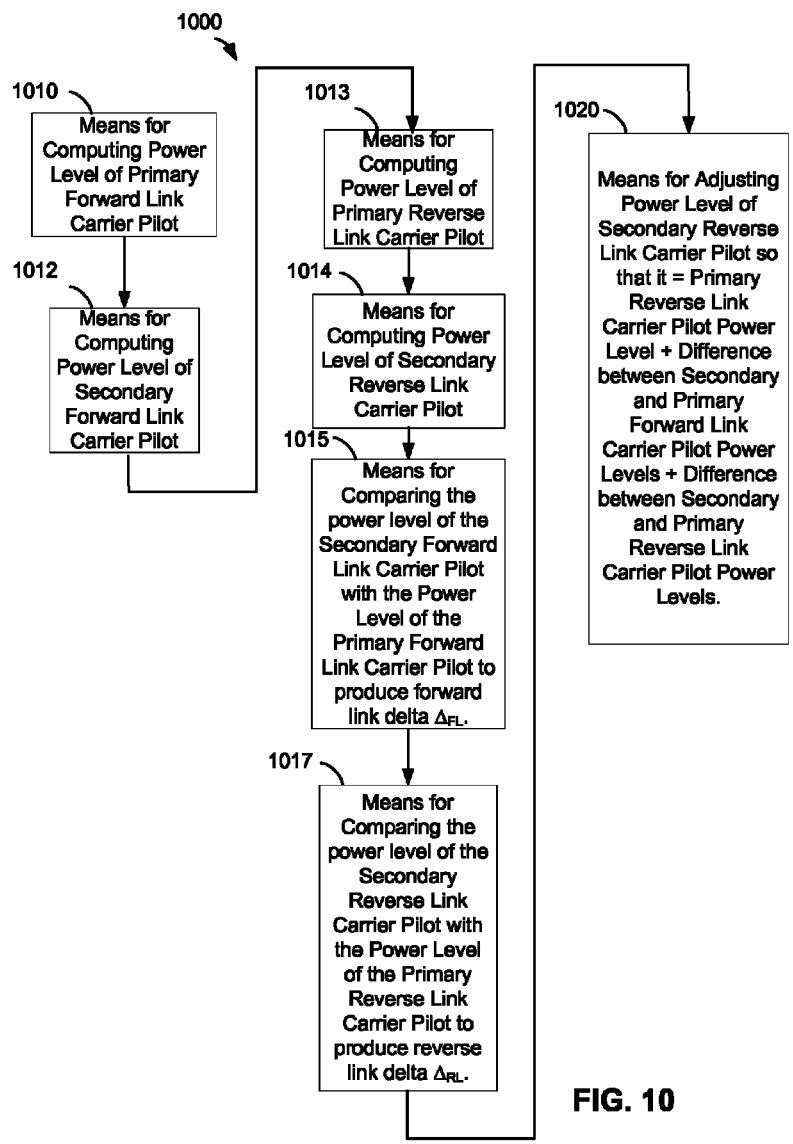
FIG. 10 is a functional block diagram illustrating a means for setting a secondary reverse link carrier pilot power level based on a differential between the primary and the secondary forward link carrier pilot power levels and a differential between the primary and the secondary reverse link carrier pilot power levels.
Figure 11:
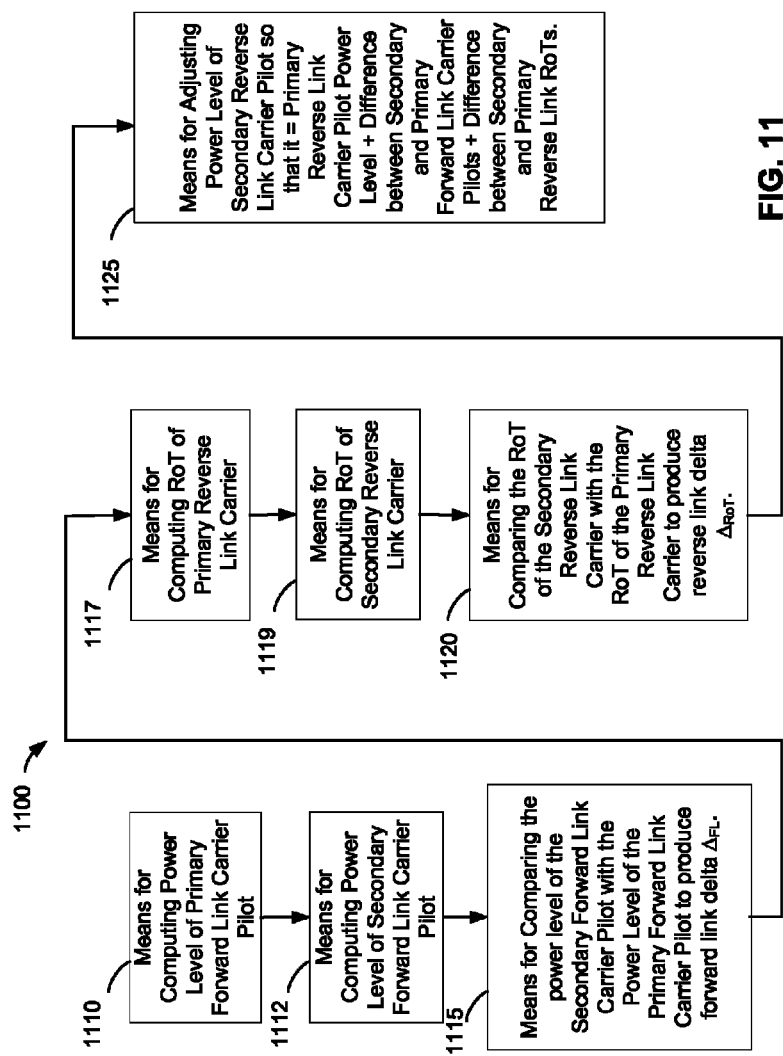
FIG. 11 is a functional block diagram illustrating a means for setting a secondary reverse link carrier based on a differential between the primary and the secondary reverse link carrier rise-over-thermals and a differential between the primary and the secondary forward link carrier pilot power levels.
Figure 12:
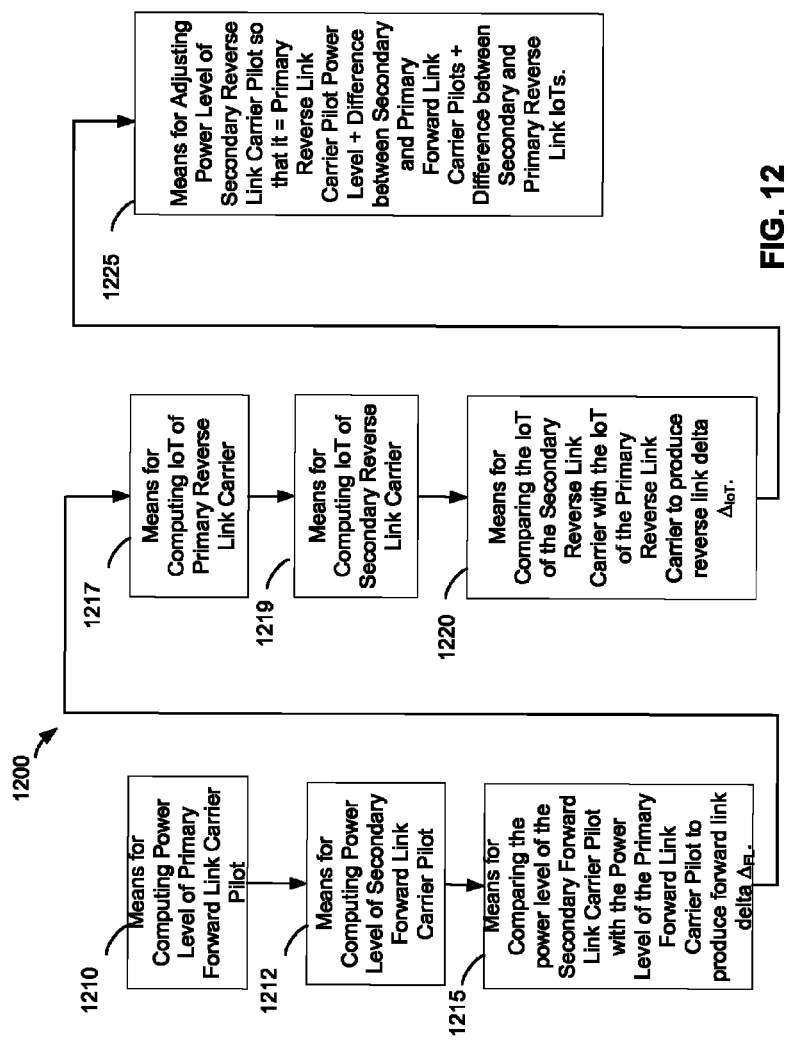
FIG. 12 is a functional block diagram illustrating a means for setting a secondary reverse link carrier based on a differential between the primary and the secondary forward link carrier power levels and on a differential between the primary and the secondary reverse link carrier interference-over-thermals.

Use of an IoT is illustrated in flowchart 800 illustrated in FIG. 8B. Compute the power level of the primary forward link carrier pilot (Step 810) and compute the power level of the secondary forward link carrier pilot (Step 812). Next, compare the power level of the secondary forward link carrier pilot with the power level of the primary forward link carrier pilot (step 815), whereby a difference between the primary forward link carrier pilot and the secondary forward link carrier pilot is generated. This difference between the primary forward link carrier power, ($P_{PFL}$), and the secondary forward link carrier, ($P_{SFL}$), may be referred to as a forward link delta $\Delta_{FL}$.

Likewise, the access network 120 computes the IoT of the primary reverse link carrier (Step 817). Next, the access network 120 computes the IoT of the secondary reverse link carrier (Step 819). The access network 120 then compares the IoT of the primary reverse link carrier and the IoT of the secondary reverse link-carrier producing a delta of the IoTs, reverse link delta $\Delta_{IoT}$ and sends this differential to the AT 106 (Step 820).

The power level of the secondary reverse link carrier pilot, (PSRL), is then adjusted to equal the power level of the primary reverse link carrier pilot, (PPRL), and $\Delta$FL and $\Delta_{IoT}$. (Step 825). This is illustrated in equation 6.

$$(P_{SRL}) = (P_{PRL}) + \Delta_{FL} + \Delta_{IoT},  \quad \text{Eq. 6}$$

where $|P_{SRL} - P_{(S\pm1)RL}| < Z_{db}$, $Z_{db}$ represents the transmit power differential between two adjacent carriers and $(P_{(S\pm1)RL})$ represents another secondary reverse link carrier pilot adjacent to the secondary reverse link carrier pilot, $(P_{SRL})$.

The steps executed in the above mention flowcharts may, in one embodiment, be stored in memory 416 as instructions which may be executed by the processor or processor means 302. See FIG. 4. Steps executed in the above mention flowcharts may, in one embodiment, be stored in memory 162 as instructions which may be executed by the power differential calculation unit 161 or other processor or processor means in the access network 120. See FIG. 2B.

The methods and apparatuses of FIGS. 5, 6B, 7 and 8B described above are performed by corresponding means plus function blocks illustrated in FIGS. 9-12 respectively. In other words, apparatuses 510, 512, 515 and 520 in FIG. 5 correspond to means plus function blocks 910, 912, 915 and 920 in FIG. 9. Apparatuses 610, 612, 613, 614, 615, 617 and 620 in FIG. 6B is performed by corresponding means plus function blocks 1010, 1012, 1013, 1014, 1015, 1017 and 1020 in FIG. 10. Apparatuses 710, 712, 715, 717, 719, 720 and 725 illustrated in FIG. 7 is performed by corresponding means plus function clocks 1110, 1112, 1115, 1117, 1119, 1120 and 1125 in FIG. 11. Apparatuses 810, 812, 815, 817, 819, 820 and 825 illustrated in FIG. 8B is performed by corresponding means plus function clocks 1210, 1212, 1217, 1219, 1220 and 1225 in FIG. 12.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal, comprising:
   a processing unit; and
   a memory coupled to said processing unit, wherein said memory comprises instructions to determine a power of a primary reverse link carrier at a first frequency and instructions to determine a power of a secondary reverse link carrier at a second frequency based on said power of said primary reverse link carrier at said first frequency, said primary and secondary reverse link carriers corresponding to two carriers at different first and second frequencies for a reverse link for a base station,
   wherein said instructions to determine said power of said secondary reverse link carrier comprise instructions to:
      compute a forward link power differential between a primary forward link carrier and a secondary forward link carrier; and
      determine said power of said secondary reverse link carrier based on said power of said primary reverse link carrier and said forward link power differential.

2. The access terminal according to claim 1, wherein said memory further comprises instructions to:
   determine a power of another secondary reverse link carrier based on said power of said secondary reverse link carrier.

3. The access terminal according to claim 2, wherein said memory further comprises instructions to:

limit a difference between said power of said secondary reverse link carrier and said power of said another secondary reverse link carrier to a predetermined amount.

4. The access terminal according to claim 1, wherein said instructions to determine said power of said secondary reverse link carrier further comprise instructions to:
obtain a reverse link load differential between said primary reverse link carrier and said secondary reverse link carrier; and
determine said power of said secondary reverse link carrier based further on said reverse link load differential.

5. The access terminal according to claim 4, wherein said reverse link load differential is determined based on a rise-over-thermal for each reverse link carrier.

6. The access terminal according to claim 4, wherein said reverse link load differential is determined based on an interference-over-thermal for each reverse link carrier.

7. The access terminal according to claim 4, wherein said reverse link load differential is determined based on a cell-load for each reverse link carrier.

8. The access terminal according to claim 1, wherein said instructions to compute a forward link power differential comprises instructions to:
compute a power level of a first pilot on said primary forward link carrier;
compute a power level of a second pilot on said secondary forward link carrier; and
compare said power levels of said first pilot on said primary forward link carrier and said second pilot on said secondary forward link carrier.

9. An access terminal, comprising:
a processing unit; and
a memory coupled to said processing unit, wherein said memory comprises instructions to determine a power of a primary reverse link carrier at a first frequency and instructions to determine a power of a secondary reverse link carrier at a second frequency based on said power of said primary reverse link carrier at said first frequency, said primary and secondary reverse link carriers corresponding to two carriers at different first and second frequencies for a reverse link for a base station,
wherein said instructions to determine said power of said secondary reverse link carrier comprises instructions to:
obtain a reverse link load differential between said primary reverse link carrier and said secondary reverse link carrier; and
determine said power of said secondary reverse link carrier based on said reverse link load differential.

10. The access terminal according to claim 9, wherein said instructions to obtain a reverse link load differential comprises instructions to:
compute a rise-over-thermal of said primary reverse link carrier;
compute the rise-over-thermal of said secondary reverse link carrier; and
compare said rise-over-thermals of said primary reverse link carrier and said secondary reverse link carrier to determine said reverse link load differential.

11. The access terminal according to claim 9, wherein said reverse link load differential is determined based on a rise-over-thermal for each reverse link carrier.

12. The access terminal according to claim 9, wherein said reverse link load differential is determined based on an interference-over-thermal for each reverse link carrier.

13. The access terminal according to claim 9, wherein said instructions to obtain a reverse link load differential comprises instructions to:
compute an interference-over-thermal of said primary reverse link carrier;
compute the interference-over-thermal of said secondary reverse link carrier; and
compare said interference-over-thermals of said primary reverse link carrier and said secondary reverse link carrier to determine said reverse link load differential.

14. A method for controlling power of an access terminal when the access terminal establishes a connection with a base station, comprising:
determining a power of a primary reverse link carrier at a first frequency; and
determining a power of a secondary reverse link carrier at a second frequency based on said power of said primary reverse link carrier at said first frequency, said primary and secondary reverse link carriers corresponding to two carriers at different first and second frequencies for a reverse link for said base station,
wherein said step of determining said power of said secondary reverse link carrier comprises:
computing a forward link power differential between a primary forward link carrier and a secondary forward link carrier; and
determining said power of said secondary reverse link carrier based on said power of said primary reverse link carrier and said forward link power differential.

15. The method according to claim 14, further comprising:
determining a power of another secondary reverse link carrier based on said power of said secondary reverse link carrier.

16. The method according to claim 15, further comprising:
limiting a difference between said power of said secondary reverse link carrier and said power of said another secondary reverse link carrier to a predetermined amount.

17. The method according to claim 14, wherein said step of determining said power of said secondary reverse link carrier further comprises:
obtaining a reverse link load differential between said primary reverse link carrier and said secondary reverse link carrier; and
determining said power of said secondary reverse link carrier based further on said reverse link load differential.

18. The method according to claim 17, wherein said reverse link load differential is determined based on a rise-over-thermal for each reverse link carrier.

19. The method according to claim 17, wherein said reverse link load differential is determined based on an interference-over-thermal for each reverse link carrier.

20. The method according to claim 17, wherein said reverse link load differential is determined based on a cell-load for each reverse link carrier.

21. The method according to claim 14, wherein said step of computing a forward link power differential comprises:
computing a power level of a first pilot on said primary forward link carrier;
computing a power level of a second pilot on said secondary forward link carrier; and
comparing said power levels of said first pilot on said primary forward link carrier and said second pilot on said secondary forward link carrier.

22. A method for controlling power of an access terminal when the access terminal establishes a connection with a base station, comprising:
determining a power of a primary reverse link carrier at a first frequency; and
determining a power of a secondary reverse link carrier at a second frequency based on said power of said primary reverse link carrier at said first frequency, said primary and secondary reverse link carriers corresponding to two carriers at different first and second frequencies for a reverse link for said base station, wherein said step of determining said power of said secondary reverse link carrier comprises:

obtaining a reverse link load differential between said primary reverse link carrier and said secondary reverse link carrier; and determining said power of said secondary reverse link carrier based on said reverse link load differential.

23. The method according to claim 22, wherein said step of obtaining a reverse link load differential comprises:

computing a rise-over-thermal of said primary reverse link carrier;

computing the rise-over-thermal of said secondary reverse link carrier; and comparing said rise-over-thermals of said primary reverse link carrier and said secondary reverse link carrier to determine said reverse link load differential.

24. The method according to claim 22, wherein said reverse link load differential is determined based on a rise-over-thermal for each reverse link carrier.

25. The method according to claim 22, wherein said reverse link load differential is determined based on an interference-over-thermal for each reverse link carrier.

26. The method according to claim 22, wherein said step of obtaining a reverse link load differential comprises:

computing an interference-over-thermal of said primary reverse link carrier;

computing the interference-over-thermal of said secondary reverse link carrier; and comparing said interference-over-thermals of said primary reverse link carrier and said secondary reverse link carrier to determine said reverse link load differential.

27. An apparatus for controlling power of an access terminal when the access terminal establishes a connection with a base station, comprising:

means for determining a power of a primary reverse link carrier at a first frequency; and means for determining a power of a secondary reverse link carrier at a second frequency based on said power of said primary reverse link carrier at said first frequency, said primary and secondary reverse link carriers corresponding to two carriers at different first and second frequencies for a reverse link for said base station, wherein said means for determining said power of said secondary reverse link carrier comprises:

means for computing a forward link power differential between a primary forward link carrier and a secondary forward link carrier; and means for determining said power of said secondary reverse link carrier based on said power of said primary reverse link carrier and said forward link power differential.

28. The apparatus according to claim 27, further comprising:

means for determining a power of another secondary reverse link carrier based on said power of said secondary reverse link carrier.

29. The apparatus according to claim 28, further comprising:

means for limiting a difference between said power of said secondary reverse link carrier and said power of said another secondary reverse link carrier to a predetermined amount.

30. The apparatus according to claim 27, wherein said means for determining said power of said secondary reverse link carrier further comprises:

means for obtaining a reverse link load differential between said primary reverse link carrier and said secondary reverse link carrier; and means for determining said power of said secondary reverse link carrier based further on said reverse link load differential.

31. The apparatus according to claim 30, wherein said reverse link load differential is determined based on a rise-over-thermal for each reverse link carrier.

32. The apparatus according to claim 30, wherein said reverse link load differential is determined based on an interference-over-thermal for each reverse link carrier.

33. The apparatus according to claim 30, wherein said reverse link load differential is determined based on a cell-load for each reverse link carrier.

34. The apparatus according to claim 27, wherein said means for computing a forward link power differential comprises:

means for computing a power level of a first pilot on said primary forward link carrier;

means for computing a power level of a second pilot on said secondary forward link carrier; and means for comparing said power levels of said first pilot on said primary forward link carrier and said second pilot on said secondary forward link carrier.

35. An apparatus for controlling power of an access terminal when the access terminal establishes a connection with a base station, comprising:

means for determining a power of a primary reverse link carrier at a first frequency; and means for determining a power of a secondary reverse link carrier at a second frequency based on said power of said primary reverse link carrier at said first frequency, said primary and secondary reverse link carriers corresponding to two carriers at different first and second frequencies for a reverse link for said base station, wherein said means for determining a power of a secondary reverse link carrier comprises:

means for obtaining a reverse link load differential between said primary reverse link carrier and said secondary reverse link carrier; and means for determining said power of said secondary reverse link carrier based on said reverse link load differential.

36. The apparatus according to claim 35, wherein said means for obtaining a reverse link load differential comprises:

means for computing a rise-over-thermal of said primary reverse link carrier;

means for computing the rise-over-thermal of said secondary reverse link carrier; and means for comparing said rise-over-thermals of said primary reverse link carrier and said secondary reverse link carrier to determine said reverse link load differential.

37. The apparatus according to claim 35, wherein said reverse link load differential is determined based on a rise-over-thermal for each reverse link carrier.

38. The apparatus according to claim 35, wherein said reverse link load differential is determined based on an interference-over-thermal for each reverse link carrier.

39. The apparatus according to claim 35, wherein said means for obtaining a reverse link load differential comprises:

means for computing an interference-over-thermal of said primary reverse link carrier;

means for computing the interference-over-thermal of said secondary reverse link carrier; and means for comparing said interference-over-thermals of said primary reverse link carrier and said secondary reverse link carrier to determine said reverse link load differential.

40. A computer-readable medium encoded with a computer program for an access terminal, comprising:

instructions for determining a power of a primary reverse link carrier at a first frequency; and instructions for determining a power of a secondary reverse link carrier at a second frequency based on said power of said primary reverse link carrier at said first frequency, said primary and secondary reverse link carriers corresponding to two carriers at different first and second frequencies for a reverse link for a base station, wherein said instructions for determining said power of access terminal secondary reverse link carrier comprise:

instructions for computing a forward link power differential between a primary forward link carrier and a secondary forward link carrier; and instructions for determining said power of said secondary reverse link carrier based on said power of said primary reverse link carrier and said forward link power differential.

41. A computer-readable medium encoded with a computer program for an access terminal, comprising:

instructions for determining a power of a primary reverse link carrier at a first frequency; and instructions for determining a power of a secondary reverse link carrier at a second frequency based on said power of said primary reverse link carrier at said first frequency, said primary and secondary reverse link carriers corresponding to two carriers at different first and second frequencies for a reverse link for a base station, wherein said instructions for determining said power of said secondary reverse link carrier comprise:

instructions for obtaining a reverse link load differential between said primary reverse link carrier and said secondary reverse link carrier; and instructions for determining said power of said secondary reverse link carrier based on said reverse link load differential.

* * * * *